Patented July 28, 1953

2,647,107

UNITED STATES PATENT OFFICE 2,647,107

IODOFORM AS MODIFIER IN VINYL CHLORIDE POLYMERIZATION

Arthur William Barnes, Tewin, England, assignor to Imperial Chemical Industries Limited, a corporation of Great Britain No Drawing. Application April 3, 1950, Serial No. 153,772. In Great Britain April 8, 1949

9 Claims. (Cl. 260—78.5)

This invention relates to improvements in and relating to the polymerization of vinyl chloride, and more particularly to the polymerization processes which result in the production of polymers of vinyl chloride of relatively low average molecular weight.

In general the physical properties of a polymeric material derived from any monomeric material of given composition depend on the average molecular weight of the polymeric material and on the molecular weight distribution. As the average molecular weight increases the physical state of any polymeric material passes from liquid to viscous, and then to solid state. In addition, the solubility in any given solvent and the ease of moulding decrease with increase in the average molecular weight. Thus in many cases it is impossible to employ polymeric materials of relatively high average molecular weight for applications involving solutions of polymeric material. Furthermore, the comparatively high temperatures which are required to fabricate the higher average molecular weight polymeric materials frequently cause decomposition of the polymeric materials with consequent discoloration and loss in other physical properties. These disadvantages are particularly noticeable with polyvinyl chloride. In contradistinction to these disadvantages, the polymeric materials having relatively low molecular weights are easier to fabricate in that they require low processing temperatures and have greater solubilities in solvents.

There are in general three main methods for obtaining polymeric materials of lower average molecular weight, namely:

1. Polymerization at higher temperatures.
2. Polymerization in the presence of increased amounts of polymerization catalyst.
3. Polymerization in the presence of chain transfer agents such as carbon tetrachloride, carbon tetrabromide, bromoform and ethylene dibromide.

With vinyl chloride none of these methods are satisfactory. Thus the first usually involves higher running and/or capital costs since the resultant high pressures necessitate the use of special apparatus. Increase in the amount of polymerization catalyst has no effect upon the average molecular weight of polyvinyl chloride. With the third method it has not been possible to obtain any valuable reduction in the average molecular weight of polyvinyl chloride without employing excessively large amounts of known chain transfer agents, in which case the process tends to become a solution polymerization process. The normal solution polymerization technique does effect some reduction in the average molecular weight of polyvinyl chloride but not a substantial one. With either a solution polymerization technique or the addition of a chain transfer agent, such excessive amounts of solvent or chain transfer agent must be employed that an additional process step is needed to isolate the polymer and to recover the solvent. A further objection to the use of large amounts of known chain transfer agents is that the rate of polymerization is retarded. Thus, mercaptans which are effective with certain other monomeric materials, e. g. methyl methacrylate, are largely ineffective for this reason when used with vinyl chloride.

The object of this invention is to provide a chain transfer agent suited to the polymerization of vinyl chloride alone or in admixture with other copolymerizable materials.

These objects are accomplished according to the present invention by a process for the polymerization of vinyl chloride alone or in admixture with one or more ethylenically unsaturated compounds characterized in that the polymerization is carried out in the presence of iodoform in amount up to 5% by weight of the polymerizable material. The preferred amount of iodoform is 1% or less, since more than this amount causes the rate of polymerization to be retarded appreciably. It is further preferred that the amount of iodoform should be not less than 0.2% of the polymerizable material since less than this amount will not give an appreciable reduction in the average molecular weight of the polymeric material.

The process of this invention can be applied to the copolymerization of vinyl chloride with other ethylenically unsaturated compounds such as vinyl acetate, vinyl propionate, vinylidene chloride, acrylonitrile, acrylic esters, e. g. methyl and ethyl acrylate, methacrylic esters, e. g. methyl, isopropyl and cyclohexyl methacrylates, and maleic and fumaric acids and esters, e. g. diethyl maleate and fumarate. Copolymers of these compounds with vinyl chloride when prepared in the absence of chain transfer agents generally have better flow properties and better solubilities than polyvinyl chloride produced in the absence of iodoform. The effect of iodoform on the production of the copolymers is to improve these properties still more.

A factor to indicate the activity of a chain transfer agent can be determined from the following equation:

$$\frac{1}{P} = \frac{1}{P_0} + B\left(\frac{s}{m}\right)$$

where $P$ = the average degree of polymerization of a polymer obtained by polymerization of a monomer in the presence of a chain transfer agent and is equal to the average molecular weight of the polymer divided by the molecular weight of the monomer, $P_0$ = the average degree of polymerization obtained by polymerization in the absence of a chain transfer agent.

$s$ = molar concentration of the chain transfer agent.

$m$ = molar concentration of the monomer.

$B$ = constant for any particular chain transfer agent for a particular monomer and is commonly called the "transfer coefficient."

The value of the transfer coefficient $B$ is a measure of the activity of the chain transfer agent with regard to a particular monomer.

I find that iodoform and some chain transfer agents of the prior art have the following transfer coefficients in the polymerization of vinyl chloride:

| | |
|---|---|
| Chloroform | 0.008 |
| Carbon tetrachloride | 0.016 |
| Bromoform | 0.20 |
| Iodoform | 0.75 |

In any set of polymerization recipe ingredients and polymerization conditions, the amount of iodoform present determines the average molecular weight and the yield of the resultant polymeric materials. I have found, for example, that with a particular recipe not including iodoform, polyvinyl chloride of K value 66 and in 95% yield was obtained by polymerization of vinyl chloride for 24 hours at 50° C. and in the presence of 0.2% $\alpha\alpha'$azodiisobutyronitrile. (The K values used herein are measures of the average molecular weights of the polymers and are determined by the method described by Fikentscher in Cellulose Chemie, 13, 58, 1932, using ethylene dichloride as the solvent.) By polymerizing with varying amounts of iodoform but otherwise under exactly the same conditions, polymeric materials having lower K values were obtained as shown in the following table:

| Amount of Iodoform | Yield of polyvinyl chloride | K value of polymer |
|---|---|---|
| | Percent | |
| Nil | 95 | 66 |
| 0.26% | 90 | 51 |
| 2.6% | 20 | 24 |
| 26% | (1) | |

[1] No appreciable polymerization.

Polyvinyl chloride as usually obtained, i. e. in the absence of a chain transfer agent, is a comparatively hard, tough, solid material, insoluble or only slightly soluble in most solvents, and requiring comparatively high processing temperatures during fabrication. As a result it is very difficult, if not impossible, to fabricate by moulding or extrusion such polyvinyl chloride without causing some decomposition with consequent discoloration unless large amounts of plasticizers are used. By the process of this invention, however, it is possible to polymerize vinyl chloride to give a range of products having relatively low average molecular weights (K value range 35–53 as hereinbefore defined) which may be used for a variety of applications for which polyvinyl chloride as normally obtained is not suitable. Thus polyvinyl chloride having a relatively low average molecular weight can be used for the production of shaped articles by moulding, including extrusion, under less harsh conditions than are required for polyvinyl chloride produced in the absence of chain transfer agents, with a consequent decrease in the amount of decomposition and discoloration of the polymer due to the processing conditions. The product of this invention is also suitable for the production of films by solvent casting and extrusion and also for textile and paper coating.

Decomposition and discoloration of low average molecular weight polyvinyl chloride may be still further decreased, if necessary, by the incorporation of heat stabilizers as described in British specifications Nos. 451,723; 602,312; 622,511 and in applications Nos. 27,229/48; 27,230/48 and 27,231/48. The polymers of this invention flux more easily and are more soluble than the polymers of the prior art. Any of the normal plasticizers may, however, be added to them to increase their flexibility or reduce their softening points. Other ancillary ingredients, such as dyes, pigments and fillers may also be added.

The invention is particularly applicable to polymerization in aqueous dispersion, i. e. either emulsion polymerization or granular polymerization, but it is also applicable to other techniques, including bulk and solution polymerization.

Polymerization will usually be effected by a heat polymerization catalyst such as benzoyl peroxide, lauryl peroxide, caprylyl peroxide, persulphates such as ammonium persulphate, hyponitrites such as benzyl hyponitrite, as described in British specification No. 618,168 and the azo catalysts such as those described in British specifications Nos. 626,155; 623,472; 631,225; 641,679; 649,934; 651,315; and 651,163.

British specification No. 626,155 relates to the use as polymerization catalysts of organic azo compounds such as alpha,alpha'-azodiisobutyronitrile; alpha,alpha'-azobis (alpha,gamma-dimethylvaleronitrile); dimethyl and diethyl alpha,alpha' - azodiisobutyrates; 1,1-azodicyclohexane-carbonitrile; alpha,alpha'-azobis (alpha-methylbutyronitrile); alpha,alpha'-azobis (alpha-ethylbutyronitrile); and alpha,alpha'-azodiisobutyrocarbonamide. British specification No. 634,742 relates to the use as polymerization catalysts of salts of azodisulphonic acid and mentions as examples of such salts, the azodisulphonates of lithium, sodium, potassium, beryllium, magnesium, calcium, strontium, barium and of tertiary amines. British specification No. 631,225 relates to the use as polymerization catalysts of azo compounds such as alpha,alpha'-azobis (alpha-cyclopentylpropionitrile) and alpha,alpha' - azobis (alpha-cycloheptylpropionitrile). British specification No. 641,679 shows alpha,alpha' - azodiisobutyrocarbonamide, and alpha,alpha'-azobis (alpha-cyclopropylpropionitrile). British specification No. 649,934 discloses alpha,alpha' - azobis (alpha,gamma - dimethyl capronitrile). British specification No. 651,315 relates to the use as polymerization catalysts of carbamyl azo compounds, i. e., compounds containing the group $H_2N.CO.N=N-$, and mentions as examples of such compounds alpha-(carbamylazo)-isobutyramide, methyl alpha-(carbamylazo)-isobutyrate, n-hexyl alpha-(carbamylazo)-isobutyrate, alpha-(carbamylazo)-alpha-methylenanthonitrile, alpha-(carbamylazo)-alpha-phenyl propionitrile, alpha-(carbamylazo)-cyclo hexanecarbonitrile, alpha-(carbamylazo)-alpha,-gamma-dimethylvaleramide, methyl alpha-(carbamylazo)-alpha,gamma-dimethylvalerate, alpha-carbamylazo)-alpha,alpha'-dicyclohexylacetonitrile. British specification No. 651,163 discloses alpha,alpha'-azobis(alpha-methyl-gamma-carboxybutyronitrile), alpha,alpha'-azobis-(alpha-gamma, gamma-trimethyl-gamma-carboxybutyronitrile), alpha,alpha'-azobis(alpha-methyl-gamma-phenyl-gamma-carboxybutyronitrile), alpha,alpha'-azobis(alpha-propyl-gamma-carboxybutyronitrile).

If the polymerization is carried out in aqueous dispersion (i. e. either emulsion polymerization or granular polymerization) and a heat polymerization catalyst is used, it is desirable that the catalyst should be water soluble when the polymerization is an emulsion polymerization and that the catalyst should be soluble in the monomeric material when the polymerization is a granular polymerization.

The invention is illustrated but in no way limited by the following example in which all parts are by weight:

*Example*

1980 parts of distilled water, 40 parts of the sodium salt of sulphonated methyl oleate, 44 parts of normal aqueous sodium hydroxide solution, and 1.325 parts of ammonium persulphate were introduced into a stainless steel autoclave fitted with a stirrer. The autoclave was then evacuated to a residual air pressure of 3" mercury. 1200 parts of vinyl chloride, in which had been dissolved 3.12 parts of iodoform, were then added under pressure with stirring. The autoclave was raised to a temperature of 65° C., at which it was maintained for 5 hours. The resulting aqueous polymer dispersion or latex was dried. A 70% yield of polyvinyl chloride having a K-value of 45 was obtained.

In a similar polymerization in the absence of iodoform polyvinyl chloride of K-value 53 was obtained in 80% yield.

I claim:

1. In a process for the polymerization of vinyl chloride in the presence of a catalyst selected from the group consisting of peroxy polymerization catalysts, organic azo polymerization catalysts and inorganic persulfate polymerization catalysts to form polymers of vinyl chloride of relatively low average molecular weight, the improvement which comprises carrying out the polymerization in the presence of iodoform in an amount not more than 1.0% by weight of the polymerizable material.

2. The process of claim 1 in which between 0.2 and 1.0% by weight of iodoform based on the weight of the polymerizable material is employed.

3. The process of claim 1 in which another polymerizable ethylenically unsaturated compound is copolymerized with the vinyl chloride.

4. The process of claim 3 in which the other compound is a vinyl ester.

5. The process of claim 3 in which the other compound is an acrylic ester.

6. The process of claim 3 in which the other compound is a methacrylic ester.

7. The process of claim 3 in which the other compound is a maleic ester.

8. The process of claim 3 in which the other compound is a fumaric ester.

9. The process of claim 1 in which the vinyl chloride is polymerized in the form of an emulsion in aqueous medium.

ARTHUR WILLIAM BARNES.

References Cited in the file of this patent

UNITED STATES PATENTS

| Number | Name | Date |
|---|---|---|
| 2,463,225 | Vincent | Mar. 1, 1949 |